United States Patent
Williams et al.

(10) Patent No.: US 10,713,328 B2
(45) Date of Patent: Jul. 14, 2020

(54) AUTOMATED TAGGING APPLICATION FOR MAINTAINING UP-TO-DATE WEB ANALYTICS

(71) Applicant: MasterCard International Incorporated, Purchase, NY (US)

(72) Inventors: Brian Williams, St. Peters, MO (US); Christopher Eric Mullen, St. Peters, MO (US)

(73) Assignee: Mastercard International Incorporated, Purchase, NY (US)

(*) Notice: Subject to any disclaimer, the term of this patent is extended or adjusted under 35 U.S.C. 154(b) by 281 days.

(21) Appl. No.: 15/850,731

(22) Filed: Dec. 21, 2017

(65) Prior Publication Data
US 2019/0197193 A1   Jun. 27, 2019

(51) Int. Cl.
*G06F 16/955* (2019.01)
*H04L 29/08* (2006.01)
*G06F 16/907* (2019.01)
*G06F 16/958* (2019.01)

(52) U.S. Cl.
CPC .......... *G06F 16/955* (2019.01); *G06F 16/907* (2019.01); *G06F 16/958* (2019.01); *H04L 67/02* (2013.01); *H04L 67/22* (2013.01)

(58) Field of Classification Search
CPC ....... H04L 67/22; H04L 67/02; G06F 16/907; G06F 16/955; G06F 16/958; G06F 17/30876; G06F 17/3089; G06F 17/30997
See application file for complete search history.

(56) References Cited

U.S. PATENT DOCUMENTS

| | | | |
|---|---|---|---|
| 2008/0052668 A1* | 2/2008 | Craig | G06F 16/958 717/111 |
| 2014/0280012 A1* | 9/2014 | Feuerlein | G06F 16/951 707/709 |
| 2015/0082326 A1* | 3/2015 | Milliron | G06F 9/542 719/318 |
| 2015/0356259 A1* | 12/2015 | Park | G06Q 40/08 705/2 |
| 2016/0357867 A1* | 12/2016 | Seolas | G06F 16/9566 |

OTHER PUBLICATIONS

Unknown, "Dynamic Tag Management Overview", Adobe Systems Incorporated, Copyright 2017, https://marketing.adobe.com/resources/help/en_US/dtm/c_overview.html, captured Dec. 20, 2017, 6 pages.

* cited by examiner

Primary Examiner — Michael C Lai (57) ABSTRACT

The disclosure updates website tags based on detected link changes. Link metadata based on a website is collected by an auto-tagger application. Previously collected link metadata associated with the website is accessed by the auto-tagger application. Upon detecting a link change between the collected link metadata and the accessed previously collected link metadata, the auto-tagger application identifies at least one auto-tagging rule associated with the detected link change. Tags of the website are updated by the auto-tagger application based on the identified at least one auto-tagging rule. Automatically detecting link changes and updating tags in response to the detected link changes enables consistent, accurate web analytics while reducing user effort required for website tag maintenance.

20 Claims, 5 Drawing Sheets

AUTOMATED TAGGING APPLICATION FOR MAINTAINING UP-TO-DATE WEB ANALYTICS

BACKGROUND

Many modern websites are designed to include tags that enable tracking of user interactions with the websites, and other analytics. Tags are portions of code that are linked to elements of a website that, when triggered based on interaction with the linked elements, cause actions to be performed such as incrementing counters, logging data, sending data to other applications or third parties, etc. Thus, tags provide important functionality for enabling the performance of a website to be observed via web analytics. However, a website's tag configuration is vulnerable to careless web development activities that may cause tags to be triggered inaccurately or not triggered at all. For instance, a web developer may make changes to a website that redirects a link from a first destination webpage to a second destination webpage yet fail to update a tag associated with the redirected link. Until the tag is updated, it may be triggered inaccurately based on the user interaction with the link, resulting in web analytics that indicate the first destination webpage is being accessed when it is not. Such inaccurate or "broken" tags may be difficult to identify and go unnoticed by web developers for extended periods of time. Incorrect web analytics data based on inaccurate tags increases the challenge of managing and developing effective websites based on collected user interaction data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for updating website tags based on detected link changes is described. The method comprises collecting, by an auto-tagger application, link metadata based on a website, and accessing, by the auto-tagger application, previously collected link metadata associated the website. Upon detecting a link change between the collected link metadata and the accessed previously collected link metadata, the auto-tagger application identifies at least one auto-tagging rule associated with the detected link change. The method further comprises updating, by the auto-tagger application, tags of the website based on the identified at least one auto-tagging rule.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

The systems and methods described herein update website tags based on detected link changes and associated auto-tagger rules. Link metadata based on a website is collected by an auto-tagger application. The auto-tagger application also accesses previously collected link metadata associated with the website. Upon detecting a link change between the collected link metadata and the accessed, previously collected link metadata, the auto-tagger application identifies at least one auto-tagging rule associated with the detected link change. Then, the auto-tagger application updates tags of the website based on the identified at least one auto-tagging rule. The disclosure enables rapid detection of changes to links in a website and automatic updating of tags based on the detected changes, enhancing the reliability of tag-based web analytics in a web development environment.

The described disclosure improves the user experience of using a computing device for web development and associated debugging activities, reducing the user effort required and increasing the accuracy of user-made changes to links of the website. Further, the auto-tagger application improves the functioning of the computing device by collecting link metadata of a website from multiple sources and storing the collected link metadata as historical link metadata, preserving the data for use by the auto-tagger application and potentially other applications to correct errors made during website development or updates.

Figure 1:
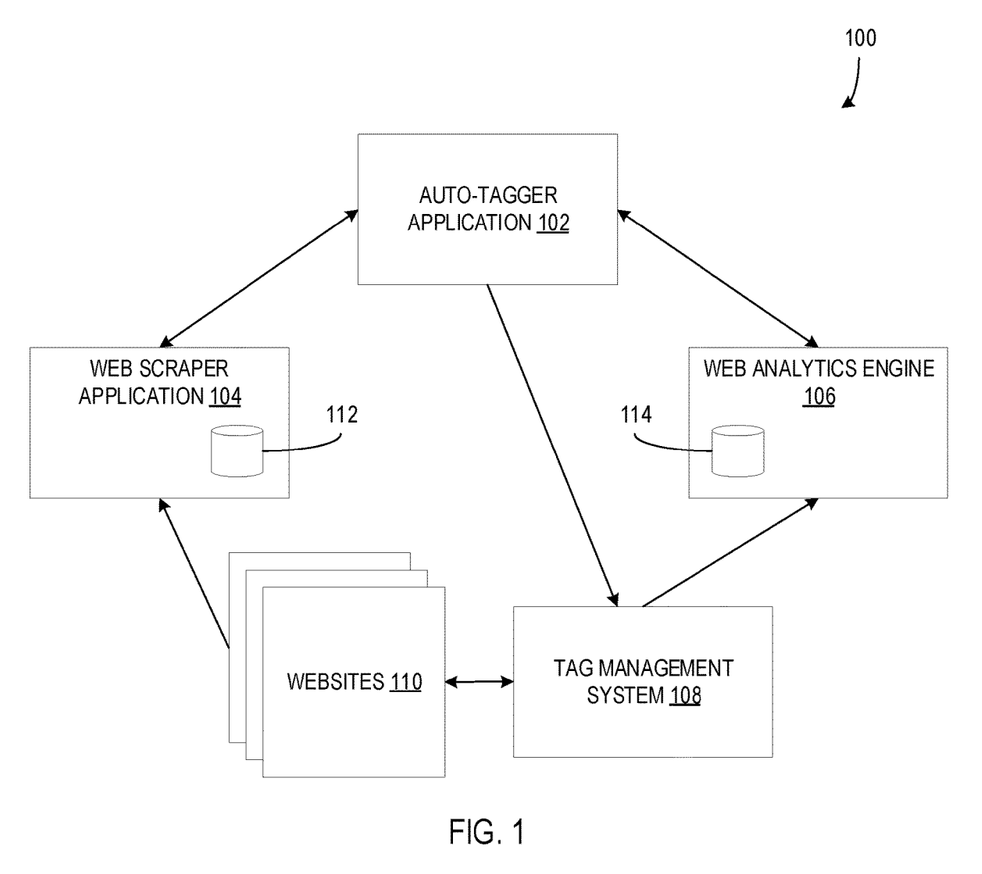
FIG. 1 is an exemplary block diagram illustrating a system configured for automatically updating a tag management system based on detected link changes according to an embodiment.

FIG. 1 is an exemplary block diagram illustrating a system 100 configured for automatically updating a tag management system 108 based on detected link changes according to an embodiment. The system 100 includes an auto-tagger application 102, a web scraper application 104, a web analytics engine 106, a tag management system 108, and associated websites 110. In some examples, the components 102-110 of the system 100 may be stored and/or executed on a single computing device or apparatus as described herein. Alternatively, the components 102-110 of the system 100 may be distributed between multiple computing devices, such that the components may be executed on separate computing devices and communicate over network connections between the separate computing devices in organizations or arrangements that would be understood by a person of ordinary skill in the art.

The auto-tagger application 102 is a software component configured to collect link metadata, identify link changes (e.g., changes to links, buttons, and/or other linkable hypertext markup language (HTML) objects, etc.) in the collected link metadata when compared to past link metadata, and apply auto-tagging rules to update the tag management system 108 based on the identified link changes. In some examples, the auto-tagger application 102 further includes a processor configured to execute instructions to provide the auto-tagger application functionality described herein. The link metadata is collected from the web scraper application 104 and/or the web analytics engine 106 based on the links of the websites 110. The updates to the tag management system 108 by the auto-tagger application 102 may reconfigure the tag management system 108 to reflect new links, changed links, or removed links in the websites 110. The auto-tagger application 102 is further described below.

The web scraper application 104 is a software component (e.g., a script, etc.) that analyzes the code of the websites 110 to identify the structure and/or components, including links, thereof. In some examples, the web scraper application 104 includes a processor configured to execute instructions to provide the web scraper application functionality described herein. The web scraper application 104 generates web scraper data 112 by crawling through the code of the websites 110, isolating code associated with links of the websites 110, and recording web scraper data 112 associated with the isolated code. The web scraper data 112 may include, for instance, link names, link targets, tags associated with links, etc. The web scraper application 104 may further include application program interfaces (APIs) enabling the auto-tagger application 102 to cause the web scraper application 104 to generate web scraper data 112 from one or more of the websites 110 and to request the web scraper data 112 from the web scraper application 104.

The web analytics engine 106 is a software component that analyzes website usage associated with the websites 110 via data obtained from the tag management system 108. In some examples, the web analytics engine 106 includes a processor configured to execute instructions to provide the web analytics engine functionality described herein. The web analytics data 114 is generated by the web analytics engine 106 based on website usage data (e.g., link click counts, page load counts, traffic source addresses or links, timestamps of interactions, query terms or other user inputs, etc.). The web analytics data may include ratios, averages, or other metrics defined to provide information about how users use the websites 110 (e.g., average time spent on a web page, percentage of visitors that click through to a particular web page, percentage of visitors that sign up and/or provide contact information on a web page, etc.). The generated web analytics data 114 may include data that is associated with key performance indicators (KPIs) defined for the websites 110, such as conversion rates, subscription rates, average transaction values, task completion rates, etc. In some examples, the web analytics data 114 may be focused on data pertaining to user interaction with links of the websites 110 (e.g., the links associated with the web scraper data 112 of the web scraper application 104, etc.). The web analytics engine 106 may further include APIs enabling the auto-tagger application 102 to cause the web analytics engine 106 to generate web analytics data 114 based on one or more of the websites 110 via the tag management system 108 and to request the web analytics data 114 from the web analytics engine 106.

The tag management system 108 is a software component configured to manage and monitor the websites 110 based on associated tags in the code of the websites 110. In some examples, the tag management system 108 includes a processor configured to execute instructions to provide the tag management functionality described herein. The tag management system 108 is configured to add, change, and/or remove tags in the websites 110 and to collect data associated with user interaction with the tags. Tags may include portions of code that may be added to the code of the websites 110 to enable tracking, analysis, and/or reporting associated with the usage of the websites 110 by users. For instance, a specific tag may be added to the code of a website 110 in association with a link of the website 110. When the link is clicked or otherwise interacted with, the tag management system 108 may detect that the link has been activated by monitoring the associated tag. It should be understood that tag management system 108 may include tag management functionality as understood by a person of ordinary skill in the art of web design, marketing, and analytics.

In some examples, the tag management system 108 stores data about the tags of the websites 110, including tag rules for when, why, and/or how the tags are activated, or fired, as well as actions that the tag management system 108 should take when the tags are activated. For instance, the activation of a tag may cause the tag management system 108 to record the activation as website usage data associated with the activated tag and/or to send a notification to a user or other component of the system indicating that the tag was activated.

The tag management system 108 may further include APIs enabling interaction with the auto-tagger application 102 and/or the web analytics engine 106. The auto-tagger application 102 may be enabled to send instructions to the tag management system 108 to cause the tag management system 108 to be updated with new tag data and/or tag rules associated with the websites 110. Further, the web analytics engine 106 may be enabled to request website usage data collected by the tag management system 108 using the tags being monitored on the websites 110.

The websites 110 include digital files that are comprised of code that, when executed by a processor of a computing device (e.g., via a web browser program, etc.) may cause the computing device to display and enable interaction with websites as described by the code. The websites 110 may include any general website functionality as understood by a person of ordinary skill in the art of website design without departing from the description herein.

Figure 2:
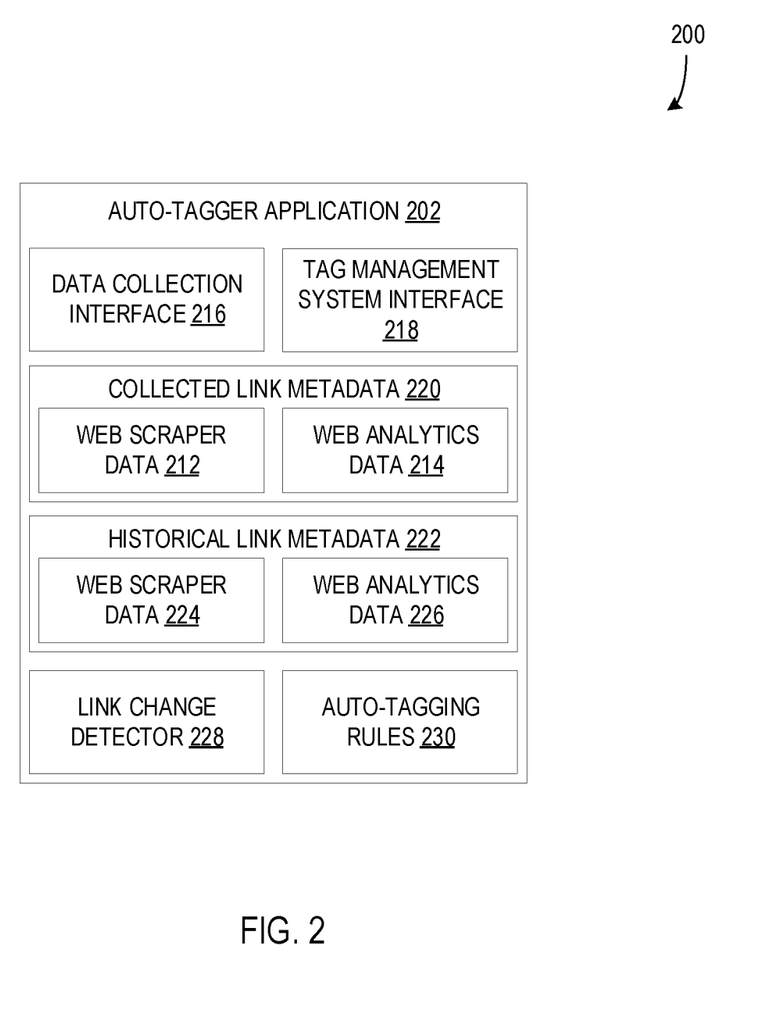
FIG. 2 is an exemplary block diagram illustrating an auto-tagger application and associated components according to an embodiment.

FIG. 2 is an exemplary block diagram 200 illustrating an auto-tagger application 202 and associated components according to an embodiment. The auto-tagger application 202 is a software application that collects link metadata associated with a website, detects changes to the link metadata in comparison to previously collected link metadata, and updates tags of the website based on the detected changes. In some examples, the auto-tagger application 202 includes a processor configured to execute instructions to provide the functionality described herein. The auto-tagger application 202 includes a data collection interface 216, a tag management system interface 218, collected link metadata 220, historical, or previously collected, link metadata 222, a link change detector 228, and auto-tagging rules 230.

The data collection interface 216 includes one or more software interfaces for receiving or collecting link metadata 220 and/or associated data from sources outside the auto-tagger application 202. For instance, the data collection interface 216 may include an interface (e.g., an application program interface (API), etc.) for collecting web scraper data 212 from a web scraper application (e.g., web scraper application 104, etc.) and/or an interface (e.g., an API, etc.) for collecting web analytics data 214 from a web analytics engine (e.g., web analytics engine 106, etc.). The data collection interface 216 may be configured to send requests for data and then receive the requested data in response. Alternatively, or additionally, the data collection interface 216 may be configured to receive data pushed from an associated data source without first requesting the data.

The tag management system interface 218 includes one or more software interfaces for communicating with a tag management system (e.g., tag management system 108, etc.), including sending instructions based on detected link changes and auto-tagging rules 230 as described below. For instance, the tag management system interface 218 may interact with one or more APIs of a tag management system to provide instructions regarding updates to tags of a website. The tag management system interface 218 may be configured to interact with one or more different types, brands, or versions of tag management systems via exposed APIs or other communication methods.

The collected link metadata 220 is collected by the auto-tagger application 202 via the data collection interface 216. The web scraper data 212 may include data as described above with respect to web scraper data 112 in FIG. 1. Further, the web scraper data 212 may include any data, type of data, or arrangement of data that may be the output of a web scraper application as understood by a person of ordinary skill in the art. Additionally, the web analytics data 214 may include data as described above with respect to web analytics data 114 in FIG. 1. The web analytics data 214 may include any data, type of data, or arrangement of data that may be the output of a web analytics engine or similar application as understood by a person of ordinary skill in the art. In some examples, web scraper data 212 and web analytics data 214 may specifically include data associated with links and tags of a website.

The historical link metadata 222 includes link metadata that has been previously collected and stored at the auto-tagger application 202 or in an associated data store or data structure. The historical link metadata 222 may include web scraper data 224 and web analytics data 226. The historical link metadata 222 may include the same or substantially similar properties as the collected link metadata 220 (e.g., the same types of data and/or arrangements of data from the same websites may be included, etc.). Further, the historical link metadata 222 may include one or more sets of previously collected link metadata, wherein each set includes link metadata from a single data collection session (e.g., one set is a link metadata set collected 24 hours ago, a second set is a link metadata set collected 48 hours ago, etc.).

The link change detector 228 is a software component for comparing the collected link metadata 220 and the historical link metadata 222 to detect differences, or link changes, between them. In some examples, the link change detector 228 includes a processor configured to execute instructions to provide the link change detection functionality described herein.

The link change detector 228 may be configured to compare link metadata values from the collected link metadata 220 and the historical link metadata 222 to detect link changes. For instance, link metadata 220 and 222 may each include link names or other identifiers, link targets (e.g., a web location that will be loaded by a browser when the associated link is activated, etc.), link location data (e.g., data indicating a section or region of the page a link should be placed, etc.), and/or other data about each link of an associated website. Each of these metadata values may be compared between the collected link metadata 220 and the historical link metadata 222 and any difference may be considered a detected link change. Further, a new link in the collected link metadata 220 may be detected due to the historical link metadata 222 lacking an equivalent link upon comparison, while a removed link that is present in the historical link metadata 222 but no longer present in the collected link metadata 220 may be detected due to the collected link metadata 220 lacking an equivalent link upon comparison.

In an example, a web developer changes the target of a link A from a webpage B to a webpage C. The historical link metadata 222 of the website includes data for link A with a target of webpage B. After the web developer makes the change, upon collection of data by the auto-tagger application 202, the collected link metadata 220 includes data for link A with a target of webpage C. The link change detector 228 detects the link change upon comparing the target of link A in the historical link metadata 222 with the target of link A in the collected link metadata 220.

In some examples, the collected link metadata 220 and historical link metadata 222 include data indicating usage of links on the associated website within a time period prior to the collection of the respective data (e.g., collected link metadata 220 may include data indicating usage of links over the previous 24 hours and historical link metadata 222 may include data indicating usage of links over the 24 hours prior to the initial collection of the link metadata 222, etc.). Usage data may include data such as total clicks on a link, click rate of a link, or other such web analytics data points from web analytics data 214 and web analytics data 226. These usage data points may be compared by the link change detector 228 such that the difference between a usage data point of the collected link metadata 220 and a usage data point of the historical link metadata 222 is considered a detected link change when the difference exceeds a defined threshold. The defined threshold may be a defined value (e.g., a difference of 1000 total clicks, etc.), a defined percentage value (e.g., a difference of 10% in click rate, etc.), or the like. For instance, if the defined threshold is a 10% difference between usage data point values, a click rate of 100 clicks/hour for link A in the historical link metadata 222 compared to a click rate of 89 clicks/hour for link A in the collected link metadata 220 is considered a detected link change by the link change detector 228.

In some examples, the link change detector 228 compares all of the collected link metadata 220 of a website to all of the historical link metadata 222 of the website to detect all link changes to the website. Each link change may be saved by the auto-tagger application 202 for use with the auto-tagging rules 230. Each detected link change may include associated data, such as a link identifier of the link changed, specific value that was changed, a link type of the link changed (e.g., link to other portion of website, link to other website, sign-up link, order link, etc.), a type of link change (e.g., a new link added, a link removed, a link target changed, link usage data change, etc.), etc.

The auto-tagger application 202 is further configured to apply auto-tagging rules 230 based on the detected link changes. In some examples, one or more auto-tagging rules 230 may be triggered by a detected link change and data associated therewith. For instance, a "new link" auto-tagging rule 230 may be triggered when a detected link change indicates a new link has been added to the website. Each auto-tagging rule 230 triggered by a detected link change may cause one or more auto-tagging instructions to be sent to a tag management system via the tag management system interface 218. For instance, the "new link" auto-tagging rule 230 may cause an instruction to be sent to the tag management system that causes the tag management system to add a new tag to the new link to track clicks or activations of the new link.

Auto-tagging rules 230 may be triggered by other link change data, such as the link type of the link that was changed or added. For instance, a new link may be a link that enables a user to sign up to the website. An auto-tagging rule 230 for sign-up links may be defined that causes a tag to be added to the associated link that tracks clicks of the link and also increments a sign-up counter of the website and/or records data associated with the user clicking the sign-up link, enabling the party that manages the website to track sign-ups specifically and to observe more in-depth information about users that choose to sign up. Other link types may include links that make a purchase or place an order, links that advance through a series of webpages, links that cancel out of a process of the website, links associated with user logins, etc. Each link type may trigger one or more associated auto-tagging rules 230 that cause a tag management system to update tags of associated links such that the operation of the links of the website are accurately tracked and/or managed.

In some examples, auto-tagger application 202 may send notifications to responsible parties upon link changes being detected by the link change detector 228 and/or tags of a website being updated based on auto-tagging rules 230. The auto-tagger application 202 may include contact information of responsible parties for each website and/or specific webpages or other subparts of websites. The notifications may be in the form of e-mail, text message, in-app messaging, or other form of notification. Further, the notifications may be sent to notify that link changes have been detected and tags have been updated accordingly or the notifications may include requests to confirm updates to tags as a result of the detected link changes. For instance, a responsible party may receive a notification email indicating that a new link A was detected in website B and a standard click-tracking tag has been added to the new link A in the website B. Alternatively, the responsible party may receive a notification email indicating that a link D has been removed from website B and that the tags associated with the removed link D will be deleted upon confirmation from the responsible party. The responsible party may then confirm the deletion of the tags or determine that the tags should not be deleted (e.g., the link D may have been removed improperly, etc.) and instruct the auto-tagger application 202 to not delete the tags.

Additionally, the auto-tagger application 202 may store the collected link metadata 220 as new historical link metadata. In some examples, the collected link metadata 220 may only be stored as the new historical link metadata when the auto-tagging rules 230 associated with any detected link changes have been applied to update the tags of the website such that the tags of the website accurately reflect the links described in the collected link metadata 220. Further, the auto-tagger application 202 may delete the previous set of historical link metadata 222 after saving the collected link metadata 220 as new historical link metadata. Alternatively, the auto-tagger application 202 may be configured to preserve sets of historical link metadata for a defined period of time (e.g., 1 week, 2 weeks, 3 months, etc.) and/or to preserve a defined number of sets of historical link metadata (e.g., the 5 previous sets of historical link metadata, the 10 previous sets of historical link metadata, etc.).

The auto-tagger application 202 may be configured to collect link metadata, detect link changes, and update tags based on the detected link changes at defined time intervals (e.g., once per day, once per week, once per six hours, etc.). Additionally, or alternatively, the auto-tagger application 202 may be configured to enable users to request that the described process be executed to bring the tags of a website up-to-date. For instance, a web developer may have recently made changes to some links of a website. To make sure the tags of the website are accurate, the web developer may request that the auto-tagger application 202 execute the described tag update process. Upon receiving the request, the auto-tagger application 202 may initiate the process by collecting the link metadata as described herein. The process may then proceed, resulting in updated tags for the website.

Figure 3:
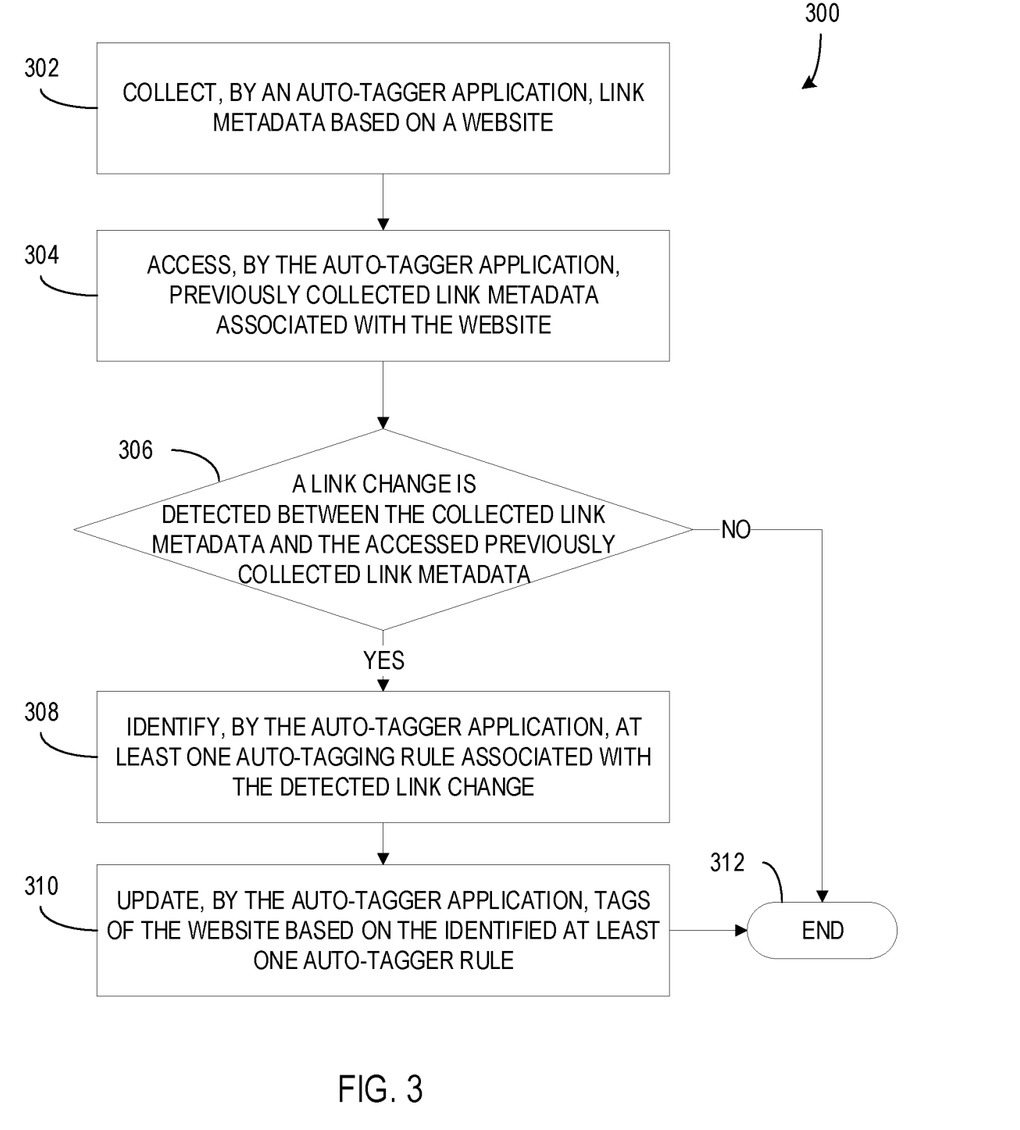
FIG. 3 is an exemplary flow chart illustrating updating a tag management system based on detected link changes according to an embodiment.

FIG. 3 is an exemplary flow chart 300 illustrating updating a tag management system based on detected link changes according to an embodiment. The process described in FIG. 3 may be executed by an auto-tagger application (e.g., auto-tagger applications 102, 202, etc.). At 302, the auto-tagger application collects link metadata (e.g., link metadata 220, etc.) based on a website (e.g., website 110, etc.). The link metadata may include web scraper data (e.g., web scraper data 212, etc.) and web analytics data (e.g., web analytics data 214, etc.). In some examples, the link metadata is collected from a web scraper application (e.g., web scraper application 104, etc.) and/or a web analytics engine (e.g., web analytics engine 106, etc.) via a data collection interface (e.g., data collection interface 216, etc.) of the auto-tagger application.

At 304, the auto-tagger application accesses previously collected link metadata (e.g., historical link metadata 222, etc.) associated with the website. The previously collected link metadata may include web scraper data (e.g., web scraper data 224, etc.) and/or web analytics data (e.g., web analytics data 226, etc.). The previously collected link metadata may be stored in a data store associated with or accessible by a computing device upon which the auto-tagger application is executed.

If, at 306, a link change is detected between the collected link metadata and the accessed previously collected link metadata, the auto-tagger application identifies at least one auto tagger rule associated with the detected link change at 308. Identifying auto-tagging rules may include identifying auto-tagging rules based on the detected link change, a type of detected link change, data values associated with the detected link change, etc. as described above with respect to the auto-tagging rules 230 in FIG. 2.

At 310, the auto-tagger application updates tags of the website based on the identified at least one auto-tagger rule. In some examples, updating the tags of the website includes instructing a tag management system associated with the website to update the tags associated with the detected link change. Updating tags may include creating new tags, editing tags, and/or removing tags. Updating tags may include updating tags associated with link clicks, webpage loads, user subscriptions, logins, repeat visitors, orders placed, etc.

If, at 306, a link change is not detected between the collected link metadata and the accessed previously collected link metadata, the process ends at 312.

Figure 4:
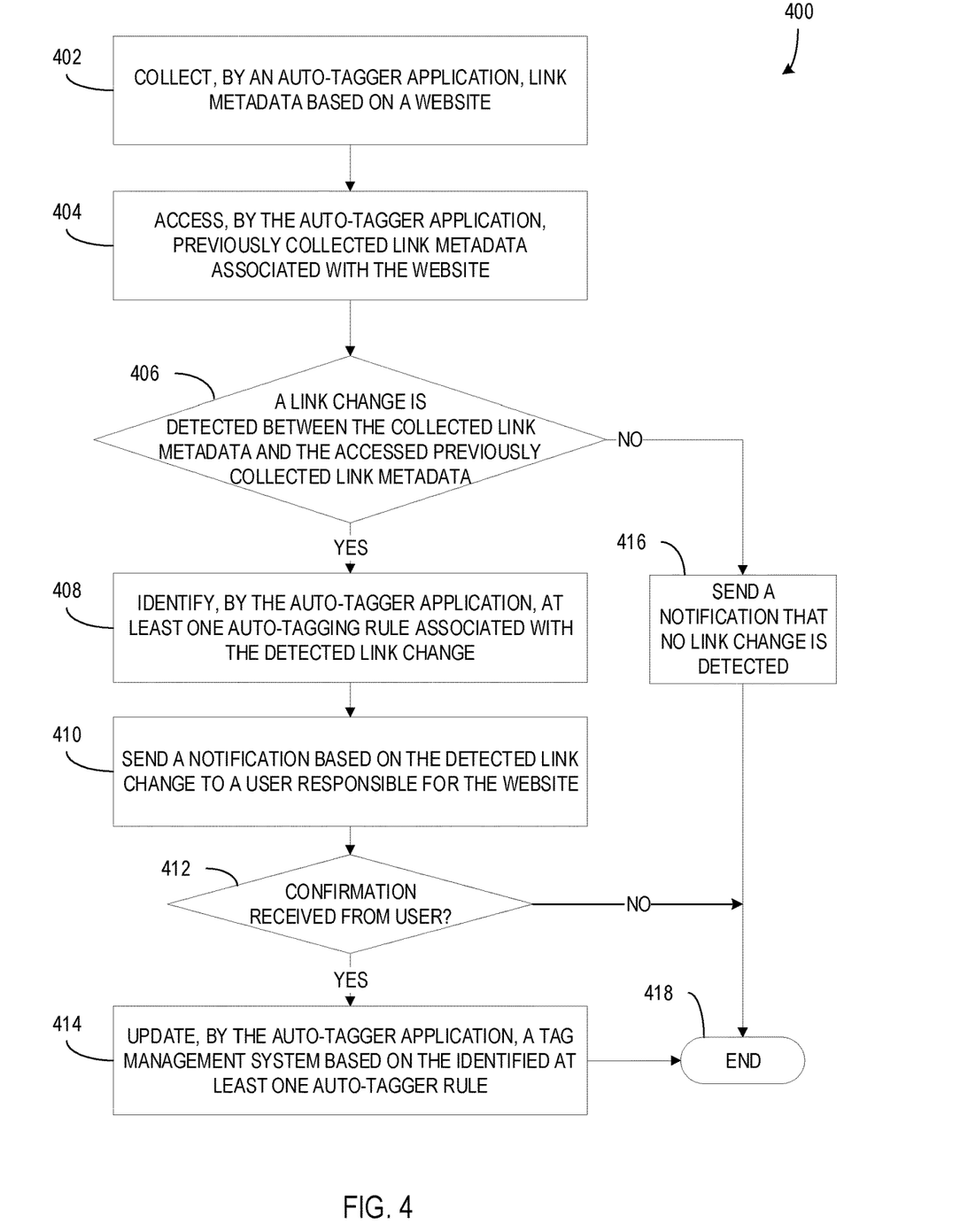
FIG. 4 is an exemplary flow chart illustrating the process of FIG. 3, further including sending notifications based on detected link changes according to an embodiment.

FIG. 4 is an exemplary flow chart 400 illustrating the process of FIG. 3, further including sending notifications based on detected link changes according to an embodiment. From 402 to 408, the link metadata is collected, the previously collected link metadata is accessed, a link change are detected, and at least one associated auto-tagger rule is identified as described above with respect to FIG. 3.

At 410, a notification based on the detected link change is sent to a user responsible for the website. The notification includes a prompt for the user to confirm that the tag update of the at least one auto-tagger rule should be done. The auto-tagger application may enable the user to view the detected link change, the triggered auto-tagger rule(s), and any tag updates that will take place as a result, giving the user the ability to confirm that the tag updates are correct.

If the notified user confirms at 412, the auto-tagger application updates an associated tag management system based on the identified at least one auto-tagger rule at 414. Updating the tag management system may include causing the tag management system to update tags associated with the detected link changes based on the identified at least one auto-tagger rule as described above with respect to 310 of FIG. 3.

If no link change is detected at 406, a notification is sent to the responsible user that no link change is detected and the process ends at 418. Additionally, if no confirmation is received from the user at 412, the process ends at 418.

Additional Example Scenarios

Aspects of the disclosure enable various additional scenarios, such as next described.

In an example, a web developer changes the code of a website to include a new link to a new webpage of the website. Overnight, an auto-tagger application associated with the website collects up-to-date link metadata associated with the website from a web scraper application and a web analytics engine. The link metadata provided by the web scraper data is compared against web scraper data collected the night before and the newly included link is detected by the auto-tagger application. No other link changes are detected. The auto-tagger application identifies an auto-tagging rule associated with newly included links that direct traffic toward internal webpages of the website. The identified auto-tagging rule is triggered by the newly included link, causing the auto-tagger application to instruct an associated tag management system to add a new tag associated with the new link. The auto-tagging rule indicates that the new tag should be triggered upon the new link being clicked and, when triggered, the new tag causes the tag management system to log that the new link was clicked and log that the associated new webpage was accessed. The newly added tag of the tag management system is configured as such based on the triggered auto-tagging rule.

In a related example, on the next day, the web developer changes the link to be a "sign-up" link, such that a user of the website provides an email address and clicks the link to sign up for a newsletter from the website. The web developer then accesses the auto-tagger application and requests that the auto-tagger application execute the described tag update process immediately. The auto-tagger application collects the current link metadata of the website from the web scraper application and the web analytics engine and detects the change made to the link by the web developer based on comparing the link metadata to the previous link metadata collected the night before. The detected change includes detecting that the link is now a sign-up link. The auto-tagger application identifies an auto-tagging rule associated with sign-up links generally and triggers it, causing the associated tag management system to update the tag(s) associated with the changed link to reflect that it is a sign-up link. In this case, the tag may cause the tag management system to increment a sign-up counter, log that the particular sign up link was clicked, and log the email address provided by the user on sign up, which may later be used by the tag management system or web analytics engine to detect repeat sign-ups or the like.

In another related example, after several weeks, another change to the website causes the rate of sign-ups via the sign-up link to drop from 100 sign-ups/week to 5 sign-ups/ week. Upon execution, the auto-tagger application detects a potential link change based on the difference in sign-ups/week via comparison of current web analytics data to previously collected web analytics data. The auto-tagger application identifies an auto-tagging rule associated with non-sign-up links that may be applicable to the sign-up link due to the significant reduction in logged sign-ups. The auto-tagger application causes a notification to be sent to the web developer that informs the web developer of the reduced sign-ups and the associated auto-tagging rule that would cause tag changes if confirmed. The web developer is prompted to either confirm or deny the application of the auto-tagging rule. In this case, the web developer determines that the auto-tagging rule should not be applied, such that the current tag of the sign-up link is preserved. Further, the web developer is alerted that there may be a problem related to the sign-up link, thereby enabling the web developer to troubleshoot the website code to rectify any discovered errors.

Exemplary Operating Environment

Figure 5:
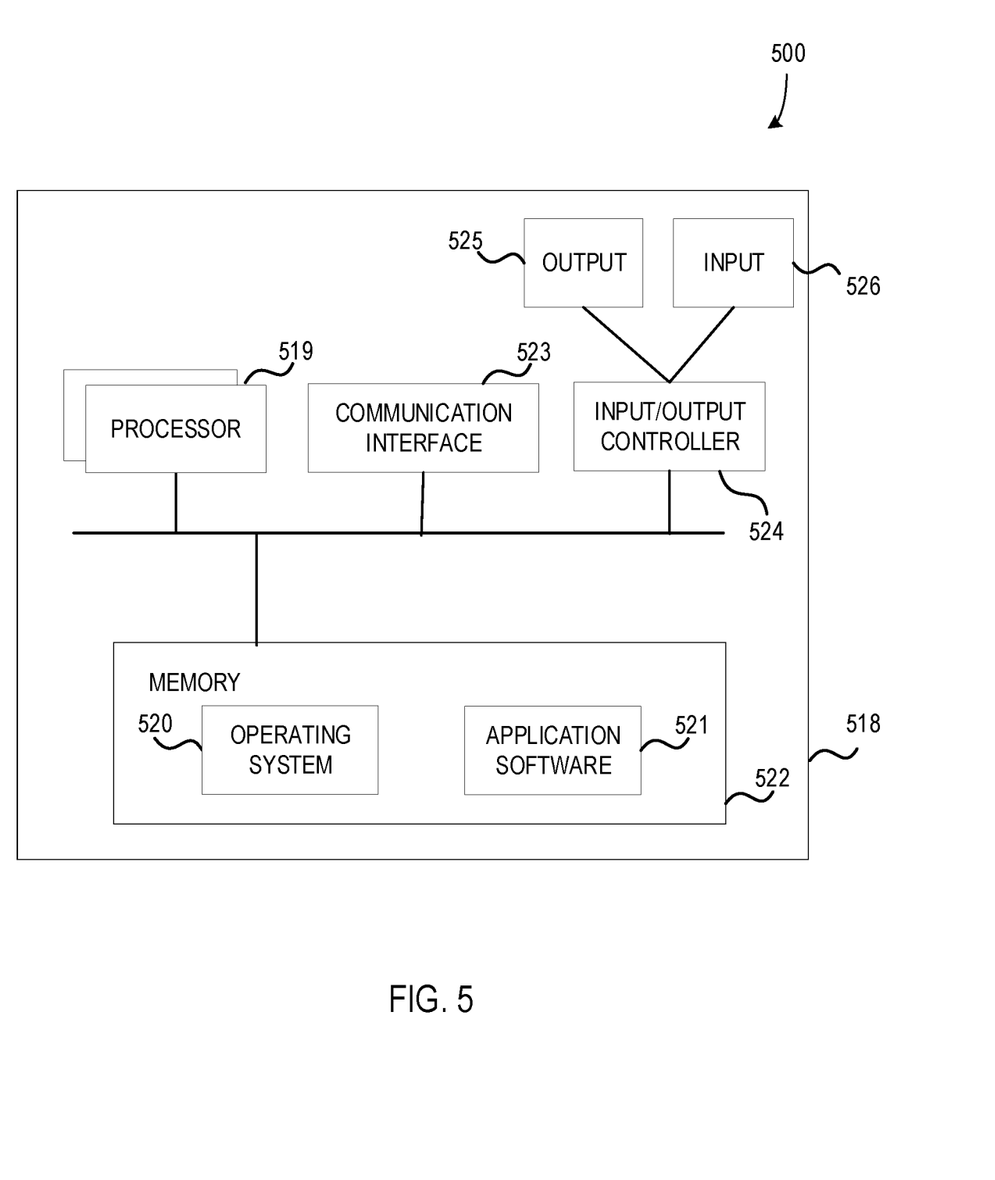
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Platform software comprising an operating system 520 or any other suitable platform software may be provided on the apparatus 518 to enable application software 521 to be executed on the device. According to an embodiment, collecting link metadata from websites, detecting changes to the collected link metadata, and updating a tag management system based on auto-tagging rules associated with the detected changes as described herein may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for updating website tags based on detected link changes, the system comprising:

at least one processor;

at least one memory comprising computer program code, the at least one memory and computer program code configured to, with the at least one processor, cause the at least one processor to:

collect, by an auto-tagger application, link metadata based on a website;

access, by the auto-tagger application, previously collected link metadata associated the website;

upon detecting a link change between the collected link metadata and the accessed previously collected link metadata, identify, by the auto-tagger application, at least one auto-tagging rule associated with the detected link change; and update, by the auto-tagger application, tags of the website based on the identified at least one auto-tagging rule.

The system described above, wherein updating tags associated with the detected link change includes updating a tag management system based on the identified at least one auto-tagging rule, whereby the tag management system is configured to manage tags associated with the detected link change.

The system described above, wherein updating the tag management system includes adding a tag to a link of the website associated with the detected link change.

The system described above, wherein updating the tag management system includes updating a tag management rule associated with a tag of the website.

The system described above, wherein the updated tag management rule includes tracking at least one of link clicks, webpage loads, user subscriptions, logins, repeat visitors, or orders placed.

The system described above, wherein detecting a link change includes at least one of detecting a new link in the website or detecting a removed link based on web scraper data of the collected link metadata.

A computerized method for updating website tags based on detected link changes comprising:

collecting, by an auto-tagger application, link metadata based on a website;

accessing, by the auto-tagger application, previously collected link metadata associated the website;

upon detecting a link change between the collected link metadata and the accessed previously collected link metadata, identifying, by the auto-tagger application, at least one auto-tagging rule associated with the detected link change; and updating, by the auto-tagger application, tags of the website based on the identified at least one auto-tagging rule.

The computerized method described above, wherein updating tags associated with the detected link change includes updating a tag management system based on the identified at least one auto-tagging rule, whereby the tag management system is configured to manage tags associated with the detected link change.

The computerized method described above, wherein updating the tag management system includes adding a tag to a link of the website associated with the detected link change.

The computerized method described above, wherein updating the tag management system includes updating a tag management rule associated with a tag of the website.

The computerized method described above, wherein the updated tag management rule includes tracking at least one of link clicks, webpage loads, user subscriptions, logins, repeat visitors, or orders placed.

The computerized method described above, wherein detecting a link change includes at least one of detecting a new link in the website or detecting a removed link based on web scraper data of the collected link metadata.

The computerized method described above, wherein detecting a link change includes detecting a click rate change of a link that exceeds a defined threshold based on web analytics data of the collected link metadata.

The computerized method described above, further comprising storing the collected link metadata with the previously collected link metadata.

The computerized method described above, further comprising causing, by the auto-tagger application, a notification based on the detected link change to be sent to a user responsible for the website.

The computerized method described above, wherein the notification based on the detected link change prompts the user for confirmation, wherein the auto-tagger application updates the at least one tag only upon receiving confirmation from the user.

The computerized method described above, further comprising causing, by the auto-tagger application, a notification indicating that no link changes are detected upon no link changes being detected between the collected link metadata and the previously collected link metadata.

One or more computer storage media having computer-executable instructions for updating website tags based on detected link changes that, upon execution by a processor, cause the processor to at least:

collect, by an auto-tagger application, link metadata based on a website;

access, by the auto-tagger application, previously collected link metadata associated the website;

upon detecting a link change between the collected link metadata and the accessed previously collected link metadata, identify, by the auto-tagger application, at least one auto-tagging rule associated with the detected link change; and update, by the auto-tagger application, tags associated with a tag management system based on the identified at least one auto-tagging rule, whereby the tag management system is configured to manage tags associated with the detected link change.

The one or more computer storage media described above, wherein the computer-executable instructions, upon execution by a processor, further cause the processor to cause, by the auto-tagger application, a notification based on the detected link change to be sent to a user responsible for the website.

The one or more computer storage media described above, wherein the computer-executable instructions, upon execution by a processor, further cause the processor to cause, by the auto-tagger application, a notification indicating that no link changes are detected upon no link changes being detected between the collected link metadata and the previously collected link metadata.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for collecting link metadata based on a website; means for accessing previously collected link metadata associated with the website; means for, upon identifying a link change between the collected link metadata and the accessed previously collected link metadata, identifying at least one auto-tagging rule associated with the detected link change; and means for updating tags of the website based on the identified at least one auto-tagging rule. The illustrated one or more processors 519 together with the computer program code stored in memory 522 constitute exemplary processing means for updating website tags based on detected link changes, including processing means for detecting the link changes between two sets of link metadata and applying auto-tagging rule to update the tags, as described herein.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for updating website tags based on detected link changes, the system comprising:
   at least one processor; and
   at least one memory comprising computer program code, the at least one memory and computer program code configured to, upon execution by the at least one processor, cause the at least one processor to:
      collect, by an auto-tagger application, link metadata associated with at least one link on a website, the at least one link having one or more tags associated therewith;
      access, by the auto-tagger application, previously collected link metadata associated with the at least one link on the website;
      compare the collected link metadata with the previously collected link metadata;
      upon detecting, based on the comparing, a link change between the collected link metadata and the accessed previously collected link metadata, identify, by the auto-tagger application, at least one auto-tagging rule associated with the detected link change, wherein the identified at least one auto-tagging rule determines one or more instructions corresponding to the detected link change; and
      update, by the auto-tagger application, at least one tag of the one or more tags based on application of the one or more instructions determined by the identified at least one auto-tagging rule, the updated at least one tag enabling accurate tracking of user interactions with the at least one link.

2. The system of claim 1, wherein updating the at least one tag includes updating a tag management system based on the identified at least one auto-tagging rule, whereby the tag management system is configured to manage tags associated with the detected link change.

3. The system of claim 2, wherein updating the tag management system includes adding a tag associated with the detected link change to a link of the website.

4. The system of claim 2, wherein updating the tag management system includes updating a tag management rule associated with a tag of the website.

5. The system of claim 4, wherein the updated tag management rule includes tracking at least one of link clicks, webpage loads, user subscriptions, logins, repeat visitors, or orders placed.

6. The system of claim 1, wherein detecting the link change includes at least one of detecting a new link on the website or detecting a removed link based on web scraper data of the collected link metadata.

7. A computerized method for updating website tags based on detected link changes comprising:
   collecting, by an auto-tagger application, link metadata associated with at least one link on a website, the at least one link having one or more tags associated therewith;
   accessing, by the auto-tagger application, previously collected link metadata associated the at least one link on the website;
   comparing the collected link metadata with the previously collected link metadata;
   upon detecting, based on the comparing, a link change between the collected link metadata and the accessed previously collected link metadata, identifying, by the auto-tagger application, at least one auto-tagging rule associated with the detected link change, wherein the identified at least one auto-tagging rule determines one or more instructions corresponding to the detected link change; and
   updating, by the auto-tagger application, at least one tag of the one or more tags based on application of the one or more instructions determined by the identified at least one auto-tagging rule, the updated at least one tag enabling accurate tracking of user interactions with the at least one link.

8. The computerized method of claim 7, wherein updating the at least one tag includes updating a tag management system based on the identified at least one auto-tagging rule, whereby the tag management system is configured to manage tags associated with the detected link change.

9. The computerized method of claim 8, wherein updating the tag management system includes adding a tag associated with the detected link change to a link of the website.

10. The computerized method of claim 8, wherein updating the tag management system includes updating a tag management rule associated with a tag of the website.

11. The computerized method of claim 10, wherein the updated tag management rule includes tracking at least one of link clicks, webpage loads, user subscriptions, logins, repeat visitors, or orders placed.

12. The computerized method of claim 7, wherein detecting a link change includes at least one of detecting a new link on the website or detecting a removed link based on web scraper data of the collected link metadata.

13. The computerized method of claim 7, wherein detecting the link change includes detecting a click rate change of a link on the website that exceeds a defined threshold based on web analytics data of the collected link metadata.

14. The computerized method of claim 7, further comprising storing the collected link metadata with the previously collected link metadata.

15. The computerized method of claim 7, further comprising causing, by the auto-tagger application, a notification based on the detected link change to be sent to a user responsible for the website.

16. The computerized method of claim 15, wherein the notification based on the detected link change prompts the user for confirmation, wherein the auto-tagger application updates the at least one tag only upon receiving confirmation from the user.

17. The computerized method of claim 7, further comprising causing, by the auto-tagger application, a notification indicating that no link changes are detected upon no link changes being detected between the collected link metadata and the previously collected link metadata.

18. One or more computer storage media having computer-executable instructions for updating website tags based on detected link changes that, upon execution by a processor, cause the processor to at least:

collect, by an auto-tagger application, link metadata associated with at least one link on a website, the at least one link having one or more tags associated therewith;

access, by the auto-tagger application, previously collected link metadata associated the at least one link on the website;

compare the collected link metadata with the previously collected link metadata;

upon detecting, based on the comparing, a link change between the collected link metadata and the accessed previously collected link metadata, identify, by the auto-tagger application, at least one auto-tagging rule associated with the detected link change, wherein the identified at least one auto-tagging rule determines one or more instructions corresponding to the detected link change; and update, by the auto-tagger application, at least one tag of the one or more tags based on application of the one or more instructions determined by the identified at least one auto-tagging rule, the updated at least one tag enabling accurate tracking of user interactions with the at least one link.

19. The one or more computer storage media of claim 18, wherein the computer-executable instructions, upon execution by a processor, further cause the processor to cause, by the auto-tagger application, a notification based on the detected link change to be sent to a user responsible for the website.

20. The one or more computer storage media of claim 18, wherein the computer-executable instructions, upon execution by a processor, further cause the processor to cause, by the auto-tagger application, a notification indicating that no link changes are detected upon no link changes being detected between the collected link metadata and the previously collected link metadata.

* * * * *